United States Patent Office 3,378,913
Patented Apr. 23, 1968

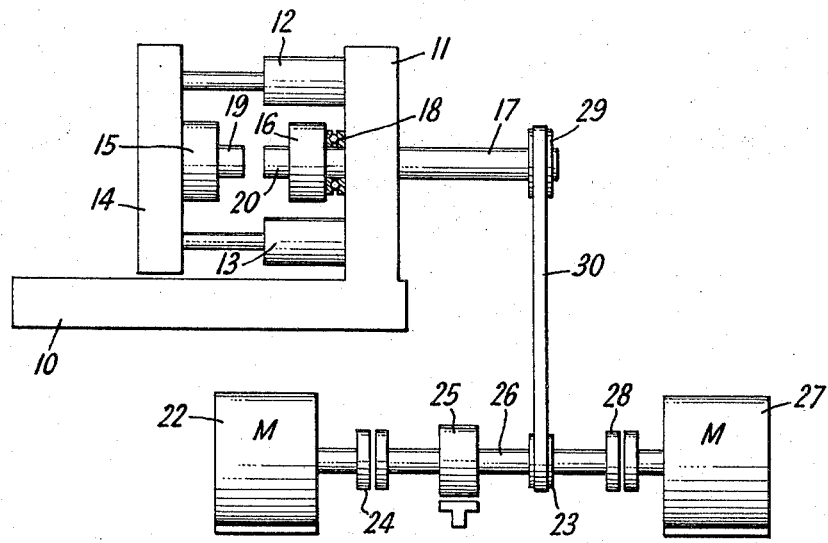

3,378,913
FRICTION WELDING MARAGING STEEL
Joseph Chin Jung Cheng, Norwalk, Conn., assignor, by mesne assignments, to Caterpillar Tractor Co., Peoria, Ill., a corporation of California
Filed Mar. 25, 1964, Ser. No. 354,657
4 Claims. (Cl. 29—470.3)

This invention relates in general to the welding of metals and, more particularly, to the friction welding of metals.

Friction welding consists of joining two workpieces by rapidly rotating the workpieces relative to each other, forcing the rapidly rotating workpieces together to generate heat in the area of contact or the weld area, either allowing the relative rotation of the workpieces to come to a stop as energy of rotation is delivered to the weld area or rapidly stopping the relative rotation of the workpieces, and continuing to force the workpieces together to complete a friction weld.

Maraging steel derives unique properties from a metallurgical concept of age hardening a low carbon, iron-nickel martensite. There are several types of maraging steel according to their nickel contents, such as 9%, 18%, 20%, 25%, etc. There are also several grades of maraging steels which are expressed by their yield strengths, as for example, 230,000 p.s.i. maraging steel, 250,000 p.s.i. maraging steel, etc. However, the physical, mechanical and metallurgical characteristics of maraging steel are generally similar.

Because maraging steel has characteristic high strength, notch toughness, and ease of heat treatment, it is widely used in pressure vessels, storage bottles, aircraft landing gear components, high pressure tubing, cryogenic systems, and ship plates. In many of these applications great savings could be realized by friction welding elements of maraging steel to each other.

It is, therefore, a main object of this invention to provide a method for friction welding maraging steel.

Another object of this invention is to provide a method of friction welding maraging steel which minimizes the heat affected zone of the welded workpieces.

Many other objects, advantages and features of invention reside in the particular process of this invention as will be understood from the following description and accompanying drawing wherein:

The figure of the drawing is a side view of a friction welding apparatus which may be used in the practice of this invention.

Referring to the drawing in detail, a base 10 has an upright member 11 extending therefrom. Two hydraulic cylinders 12 and 13 may be activated to move the member 14 toward member 11. A stationary chuck 15 is fixed to member 14 so that it cannot rotate. A rotatably mounted chuck 16 is fixed to shaft 17 to rotate with it. A thrust bearing 18 is provided behind chuck 16. The workpieces 19 and 20 to be friction welded are held in the chucks 15 and 16. A motor 22 drives a pulley 23 through the clutch 24. A brake 25 is mounted on the shaft 26 to which the pulley 23 is secured. A flywheel mass 27 may be connected to pulley 23 by means of a clutch 28. Pulley 23 drives pulley 29 by means of a belt 30.

If an inertia friction weld is to be made, the workpieces 19 and 20 are fixed in the chucks 15 and 16. Brake 25 is disengaged and the clutches 24 and 28 are engaged so that motor 22 may rapidly rotate the flywheel mass 27 and chuck 16. If desired, clutch 24 may be disengaged and the cylinders 12 and 13 activated to force the relatively rotating workpieces 19 and 20 together. Kinetic energy from the rotating masses is delivered to the weld area or the area of contact between the workpieces 19 and 20 until the rotation of workpiece 20 ceases. Cylinders 12 and 13 are continued to be activated to complete the friction weld.

A conventional friction weld may be made by placing the workpieces 19 and 20 in the chucks 15 and 16. Clutch 24 is engaged and brake 25 and clutch 28 are disengaged. Motor 22 drives pulley 23 and thereby chuck 16. While chuck 16 is being driven by motor 22, the cylinders 12 and 13 are activated to force the relatively rotating workpieces together. After a desired amount of energy is thus delivered to the weld area, clutch 24 is disengaged and brake 25 is applied to rapidly stop the relative rotation. Cylinders 12 and 13 are continued to be activated to force the workpieces together and complete the friction weld.

When friction welding maraging steel, the following parameters must be observed. First, at least 1000 ft.-lbs. and not more than 30,000 ft.-lbs. per square inch of weld area must be applied. Second, pressure or force up to the yield strength of the particular maraging steel may be applied during the weld cycle. Third, whether the inertia or the conventional friction welding technique, hereinbefore described, is used the total amount of weld energy required should be discharged into the weld area in less than ten seconds. For best results, this energy should be discharged into the weld area in less than two seconds.

As an example of this invention, maraging steel of the following content was welded: nickel 17–19%, cobalt 7–8.5%, molybdenum 4.6–5.2%, titanium, .3–.5%, manganese .10% maximum, silicon .10% maximum, carbon .03% maximum, and the balance iron. This steel had the following properties. Rockwell "C" hardness, annealed 28, maraged 50; 0.2% yield strength (p.s.i.), annealed 95,000 maraged 250,000; tensile strength (p.s.i.), annealed 140,000 maraged 255,000; elongation in 1 inch, annealed 17%, maraged 10%; reduction in area, annealed 75%, maraged 45%; notched/unnotched tensile strength, maraged 1.4. One-half inch diameter solid bars of this maraging steel were friction welded. The total welding energy was 3,000 ft.-lbs. delivered to the weld area with a pressure being applied of 20,000 p.s.i. during the entire welding cycle. Excellent welds of 100 percent weld efficiency were obtained after post heat treatment at 900° F., for three hours.

Friction welded maraged steel workpieces are superior to otherwise welded workpieces because the heat affected zone is relatively small. Thus the unique properties of the maraged steel workpieces are only distorted in a small area. The actual weld area after heat treatment may be as strong as the parent metal itself.

While this invention has been described in the best form known, it will nevertheless be understood that this is purely exemplary and that modifications may be made without departing from the spirit of the invention except as it may be more limited in the appended claims wherein what is claimed is:

1. The process of friction welding maraging steel workpieces comprising the steps of relatively rotating the workpieces while forcing them together with a force not in excess of the yield strength of the workpieces to put at least 1,000 ft.-lbs. and less than 30,000 ft.-lbs. of energy per square inch of weld area into the weld area, and stopping the relative rotation of the workpieces while continuing to force them together to complete the friction weld wherein the energy is put into the weld area in less than ten seconds.

2. The process of friction welding maraging steel workpieces comprising the steps of relatively rotating the workpieces while forcing them together with a force not in excess of the yield strength of the workpieces to put at least 1,000 ft.-lbs. and less than 30,000 ft.-lbs. of energy per square inch of weld area into the weld area, and stopping the relative rotation of the workpieces while continuing to force them together to complete the friction weld wherein the energy is put into the weld area in less than two seconds.

3. The process of friction welding maraging steel workpieces comprising the steps of relatively rotating the workpieces while forcing them together with a force not in excess of the yield strength of the workpiece to put at least 1,000 ft.-lbs. and less than 30,000 ft.-lbs. of energy per square inch of weld area into the weld area in less than ten seconds, stopping the relative rotation of the workpieces while continuing to force them together to complete a friction weld, and heat treating the welded workpieces.

4. The combination according to claim 3 wherein the welded workpieces are heat treated at a temperature of 900° F. for about three hours.

References Cited

UNITED STATES PATENTS

| | | | |
|---|---|---|---|
| 2,763,923 | 9/1956 | Webb | 29—487 X |
| 2,955,353 | 10/1960 | Gross | 29—487 X |
| 3,132,937 | 5/1964 | Sandowski et al. | 148—142 X |
| 3,134,169 | 5/1964 | Hollander et al. | 29—470.3 |
| 3,235,312 | 2/1966 | Hollander | 29—470.3 X |

JOHN F. CAMPBELL, *Primary Examiner.*